United States Patent
Noguchi et al.

(10) Patent No.: US 7,364,689 B2
(45) Date of Patent: Apr. 29, 2008

(54) METHOD OF PRODUCING CORDIERITE HONEYCOMB STRUCTURE

(75) Inventors: Yasushi Noguchi, Nagoya (JP); Tomoo Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 438 days.

(21) Appl. No.: 11/082,979

(22) Filed: Mar. 18, 2005

(65) Prior Publication Data

US 2005/0212186 A1 Sep. 29, 2005

(30) Foreign Application Priority Data

Mar. 23, 2004 (JP) ............................. 2004-083861

(51) Int. Cl.
*C04B 33/32* (2006.01)
*C04B 35/00* (2006.01)

(52) U.S. Cl. ...................................... 264/630; 264/631

(58) Field of Classification Search ........ 264/630–631, 264/43, 497; 501/19, 301, 104, 113

See application file for complete search history.

(56) References Cited

U.S. PATENT DOCUMENTS

2003/0102606 A1   6/2003   Noguchi et al.
2006/0027951 A1*  2/2006   Peterson ................... 264/631

FOREIGN PATENT DOCUMENTS

JP    A 2002-293660    10/2002

OTHER PUBLICATIONS

Acti-Gel 208, Retrieved from http://www.itcglobal.com/actiminerals.htm on Aug. 16, 2005, 1 page.*
ACti Gel, ActiveMineral, Presentation, Apr. 2001, 23 pages.*

* cited by examiner

*Primary Examiner*—Carlos Lopez
(74) *Attorney, Agent, or Firm*—Oliff & Berridge, PLC

(57) ABSTRACT

A method of producing a cordierite honeycomb structure includes: preparing clay containing a cordierite raw material having an aspect ratio of 1.5 or more; forming the clay to prepare a formed product of a honeycomb shape; drying the formed product to prepare a dried honeycomb product; and firing the dried honeycomb product to prepare a cordierite honeycomb structure. The production method can obtain a cordierite honeycomb structure capable of suppressing formation of cracks during firing.

7 Claims, No Drawings

METHOD OF PRODUCING CORDIERITE HONEYCOMB STRUCTURE

BACKGROUND OF THE INVENTION

1. Field of the Invention

The present invention relates to a method of producing a cordierite honeycomb structure. More specifically, the present invention relates to a method of producing a cordierite honeycomb structure capable of enhancing a strength of a dried honeycomb product and suppressing formation of cracks during firing.

2. Description of Related Art

A need for removing fine particles or toxic substances in an exhaust gas from an internal combustion engine or a boiler has increased in consideration of its adverse effects on the environment. In particular, regulations regarding removal of fine particles (hereinafter, may be referred to as "PM") discharged from a diesel engine tend to tighten worldwide. Use of a filter (honeycomb filter) comprising a honeycomb structure as a trapping filter (diesel particulate filter, hereinafter, may be referred to as "DPF") for removing PM has attracted attention, and various systems have been proposed. The DPF generally has a structure obtained by: forming a plurality of cells serving as fluid passages and partitioned by porous partition walls; and alternately plugging the cells. Thus, the porous partition walls constituting the cells serve as filters. Further, cordierite having a small coefficient of thermal expansion and high thermal shock resistance is preferably used as a material for the DPF.

The honeycomb filer comprising such a honeycomb structure is installed in an exhaust gas system of a diesel engine and is used. The diesel engine is installed on a heavy vehicle such as a truck or a bus and has a large displacement. Thus, the honeycomb structure must be increased in size and reduced in wall thickness. However, production of a honeycomb structure increased in size and reduced in wall thickness has a problem of formation of cracks in partition walls during firing.

Meanwhile, there is disclosed a method of producing a honeycomb filter of silicon carbide, not of cordierite, using raw material powder partially having a circularity of 0.85 or less for enhancing a porosity of the honeycomb filter while suppressing warping thereof during production and maintaining a bending strength thereof (see JP 2002-293660 A, for example). However, formation of cracks is not necessarily suppressed during production by the method of producing a cordierite honeycomb structure increased in size and/or reduced in wall thickness even if the raw material has a circularity of 0.85 or less.

SUMMARY OF THE INVENTION

The present invention has been made in view of problems of conventional techniques, and an object of the present invention is therefore to provide a method of producing a cordierite honeycomb structure capable of enhancing a strength of a dried honeycomb product and suppressing formation of cracks during firing.

The present invention provides a method of producing a cordierite honeycomb structure according to the following items.

[1] A method of producing a cordierite honeycomb structure including: preparing clay containing a cordierite raw material having an aspect ratio of 1.5 or more; forming the clay to prepare a formed product of a honeycomb shape; drying the formed product to prepare a dried honeycomb product; and firing the dried honeycomb product to prepare a cordierite honeycomb structure.

[2] A method of producing a cordierite honeycomb structure according to the above item [1], in which the cordierite raw material having an aspect ratio of 1.5 or more is a fiber.

[3] A method of producing a cordierite honeycomb structure according to the above item [1] or [2], in which the cordierite raw material having an aspect ratio of 1.5 or more is one selected from the group consisting of alumina, aluminosilicate, and silica.

[4] A method of producing a cordierite honeycomb structure according to the above item [3], in which the cordierite raw material having an aspect ratio of 1.5 or more is one selected from the group consisting of fiber alumina having an average small diameter of 0.5 to 5 µm, fiber aluminosilicate having an average small diameter of 1 to 20 µm, and fiber silica having an average small diameter of 1 to 20 µm.

[5] A method of producing a cordierite honeycomb structure according to any one of the above items [1] to [4], in which the clay contains the cordierite raw material having an aspect of 1.5 or more in an amount of 5 mass % or more with respect to the total amount of the cordierite raw material included in the clay.

[6] A method of producing a cordierite honeycomb structure according to any one of the above items [1] to [5], in which the clay contains a cordierite raw material having an aspect ratio of 2 or more.

[7] A method of producing a cordierite honeycomb structure according to any one of the above items [1] to [5], in which the clay contains a cordierite raw material having an aspect ratio of 3 or more.

[8] A cordierite honeycomb structure, which is produced by the method of producing a cordierite honeycomb structure according to any one of the above items [1] to [7].

According to the method of producing a cordierite honeycomb structure of the present invention, a honeycomb formed product is prepared using clay containing a cordierite raw material having an aspect ratio of 1.5 or more. Then, the honeycomb formed product is dried to prepare a dried honeycomb product. Thus, a contact area between particles of the raw material increases and the particles of the raw material entangle with each other more strongly, thereby enhancing a strength of the dried honeycomb product. The dried honeycomb product is fired to prepare a cordierite honeycomb structure while formation of cracks due to firing is suppressed.

DETAILED DESCRIPTION OF THE INVENTION

Hereinafter, best modes (hereinafter, referred to as "embodiments") for carrying out the present invention will be described more specifically. However, the present invention is not limited to the following embodiments, and design changes, design modifications, and the like can be added arbitrarily based on a common knowledge of a person skilled in the art without departing from the scope of the present invention.

An embodiment of the method of producing a cordierite honeycomb structure of the present invention includes the steps of: preparing clay containing a cordierite raw material having an aspect ratio of 1.5 or more; forming the clay to prepare a formed product of a honeycomb shape; drying the formed product to prepare a dried honeycomb product; and firing the dried honeycomb product to prepare a cordierite honeycomb structure. Here, the aspect ratio refers to a quotient obtained by dividing a large diameter of a raw material particle by a small diameter of the raw material particle, and is represented by the following equation.

Aspect ratio=(Large diameter of raw material particle)/(Small diameter of raw material particle)

Measurement of the aspect ratio involves: taking an SEM photo of a cordierite raw material; and subjecting the obtained image to image analysis. Here, the small diameter of the raw material particle refers to a shortest length (diameter) passing through the center of gravity of the raw material particle and can be determined from the SEM photo. The large diameter of the raw material particle refers to a longest length (diameter) passing through the center of gravity of the raw material particle and can be determined from the SEM photo.

The clay contains a cordierite raw material having an aspect ratio of 1.5 or more, but the entire cordierite raw material needs not have an aspect ratio of 1.5 or more. That is, the cordierite raw material may partially have an aspect ratio of 1.5 or more. Further, the cordierite raw material partially has an aspect ratio of preferably 2 or more, more preferably 3 or more, and particularly preferably 3.5 or more. The clay containing a cordierite raw material having an aspect ratio of 1.5 or more is formed into a dried honeycomb product. Thus, a contact area between particles of the raw material increases and the particles of the raw material entangle with each other more strongly, thereby enhancing a strength of the dried honeycomb product. The dried honeycomb product is fired to prepare a cordierite honeycomb structure while formation of cracks due to firing is suppressed. Thus, an yield of the cordierite honeycomb structure improves, to thereby increase a production rate and reduce a production cost. An upper limit of the aspect ratio of the cordierite honeycomb structure having an aspect ratio of 1.5 or more is not particularly limited, but the upper limit is preferably 5.0 or less. An upper limit of the aspect ratio exceeding 5.0 deteriorates flowability of the clay and may cause problems in extrusion forming.

The cordierite raw material having an aspect ratio of 1.5 or more is preferably a fiber. This is because a strength of a dried honeycomb product can be further enhanced using the fiber than using a rod-like particle or the like having an aspect ratio of 1.5 or more in the method of producing a cordierite honeycomb structure. Here, the fiber refers to a raw material of an acicular particle shape obtained by: heating the raw material to a melting point or higher; and drawing the raw material into a fiber.

The clay contains the cordierite raw material having an aspect ratio of 1.5 or more in an amount of preferably 5 mass % or more, more preferably 7 to 40 mass %, and particularly preferably 15 to 30 mass % with respect to the total amount of the cordierite raw material. An amount of the cordierite raw material having an aspect ratio of 1.5 or more of less than 5 mass % may inhibit enhancements in strength of the dried honeycomb product.

In the embodiment of the present invention, the cordierite raw material may have a composition including ones selected from the group consisting of talc, alumina, aluminosilicate, aluminum hydroxide, silica, kaolin, mullite, and spinel for forming cordierite through firing. The cordierite raw material preferably contains alumina having an aspect ratio of 1.5 or more, aluminosilicate having an aspect ratio of 1.5 or more, or silica having an aspect ratio of 1.5 or more. Further, the cordierite raw material having an aspect ratio of 1.5 or more is preferably fiber alumina having an average small diameter of raw material particle (hereinafter, simply referred to as "small diameter") of 0.5 to 5 μm, fiber aluminosilicate having an average small diameter of 1 to 20 μm, or fiber silica having an average small diameter of 1 to 20 μm for further enhancing the strength of the dried honeycomb product. An average small diameter of fiber alumina or the like of less than a lower limit may cause problems in extrusion forming. An average small diameter of fiber alumina or the like exceeding an upper limit may not provide a target low coefficient of thermal expansion.

The cordierite raw material has an average particle diameter of preferably 0.5 to 100 μm, more preferably 1 to 50 μm. An average particle diameter of less than 0.5 μm may cause problems in extrusion forming, and an average particle diameter exceeding 100 μm may not provide the target low coefficient of thermal expansion.

In the method of producing a cordierite honeycomb structure according to the embodiment of the present invention, the clay may be prepared by mixing a binder, a pore former, a surfactant, a plasticizer, or the like in addition to the aforementioned cordierite raw material.

In the embodiment of the present invention, a predetermined raw material composition is selected from the above raw materials, and the whole is kneaded by adding water, to thereby obtain clay. A method of mixing the raw material is not particularly limited, and a typically used mixer or the like can be used. A kneading method is not particularly limited, and a typically used kneader or the like can be used. The water is preferably added in an amount of 15 to 35 mass % with respect to the total amount of the clay.

Next, the clay obtained through the step of preparing the clay is formed, to thereby prepare a formed product of a honeycomb shape. A method of forming the clay is not particularly limited, and may involve extrusion forming or the like. The obtained clay may be formed into a cylinder shape using a vacuum tug mill or the like before being formed using an extruder or the like.

Next, the formed product of a honeycomb shape is dried, to thereby prepare a dried honeycomb product. A drying method is not particularly limited, but preferably involves hot air drying, microwave drying, or the like. The hot air drying and the microwave drying may be carried out at the same time, one drying method may be carried out followed by the other drying method, or only one drying method may be carried out. Drying conditions are not particularly limited, but an example thereof includes heating at 50 to 150° C. for 10 to 100 minutes.

Next, the obtained dried honeycomb product is cut into a predetermined size as required. Then, cells may be plugged alternately if the dried honeycomb product is formed into a wall flow-type honeycomb filter such as DPF. An example of a plugging method involves: attaching a masking film on both end surfaces of the dried honeycomb product; piercing holes at positions corresponding to predetermined cells; and injecting a plugging member into opened parts (cells) for plugging. The same cordierite raw material as that used for the cordierite honeycomb structure is preferably used as a plugging material.

The obtained dried honeycomb product is cut and plugged as described above and as required, and fired under predetermined conditions, to thereby obtain a porous cordierite honeycomb structure. Firing conditions are not particularly limited, and an example thereof includes heating at 1,350 to 1,450° C. for 1 to 10 hours.

During firing of the honeycomb formed product (or dried honeycomb product), a binder or the like burns at a certain temperature range (150 to 800° C.), to thereby provide a state in which the binder or the like is removed and the cordierite raw material is not converted into cordierite. At this time, a honeycomb shape (partition wall) is brittle because the binder is not present. In the method of producing a cordierite honeycomb structure according to the embodiment of the present invention, the cordierite raw material at least partially has an aspect ratio of 1.5 or more and has a strong bonding force between particles of the raw material. Thus, the brittle honeycomb structure can maintain its shape. Further, formation of cracks can be suppressed during firing.

A structure of the cordierite honeycomb structure obtained by the method of producing a cordierite honeycomb structure according to the embodiment of the present invention is not particularly limited. For example, the method can provide a cordierite honeycomb structure having a porosity of 15 to 80%, an average pore diameter of 1 to 40 µm, a cell density of 10 to 300 cells/cm$^2$, and a partition wall thickness of 30 to 1,000 µm.

A cordierite honeycomb structure having a volume of 2,000 cm$^3$ or more can be produced by the method of producing a cordierite honeycomb structure according to the embodiment of the present invention while formation of cracks or the like is suppressed. Further, a cordierite honeycomb structure having a volume of 2,470 cm$^3$ or more can be produced by the method while formation of cracks or the like is suppressed. The upper limit of the size of the cordierite honeycomb structure obtained by the method of producing a cordierite honeycomb structure according to the embodiment of the present invention is not particularly limited, but is preferably 40,000 cm$^3$ or less. Here, the volume of the cordierite honeycomb structure refers to a volume of the entire cordierite honeycomb structure including spaces of cells and pores.

An embodiment of the cordierite honeycomb structure of the present invention is produced by the aforementioned method of producing a cordierite honeycomb structure. The cordierite honeycomb structure according to the embodiment of the present invention can be suitably used as a honeycomb filter. The cordierite honeycomb structure according to the embodiment of the present invention may be used as a honeycomb filter, to thereby provide a honeycomb filter comprising a cordierite honeycomb structure having a volume of 2,000 cm$^3$ or more, preferably 2,470 cm$^3$ or more. The cordierite honeycomb structure having a volume of 2,000 cm$^3$ or more, preferably 2,470 cm$^3$ or more obtained by the method of obtaining a cordierite honeycomb structure of the present invention may be used as a honeycomb filter. Thus, a honeycomb filter used for a large-scale diesel engine of a truck, a bus, or the like can be produced efficiently while formation of cracks is suppressed.

EXAMPLES

Hereinafter, the present invention will be described more specifically by examples, but the present invention is not limited to the examples.

Examples 1 to 4, Comparative Examples 1 to 3

A composition including 19 mass % of kaolin having an average particle diameter of 10 µm, 40 mass % of talc having an average particle diameter of 30 µm, 13 mass % of fused silica having an average particle diameter of 30 µm, 8 mass % of aluminum hydroxide having an average particle diameter of 3 µm, and 20 mass % of aluminum oxide each shown in Table 1 (for Examples 1 to 4, Comparative Examples 1 to 3) was used as a cordierite raw material. 6 mass % (respect to the total amount clay to be obtained as 100 mass %) of a binder was added to the composition, and the whole was mixed using a ploughshare mixer for 3 minutes. Then, 20 mass % (respect to the total amount of to be obtained as 100 mass %) of carbon having an average particle diameter of 40 µm as a pore former was added to the mixture, and the whole was mixed using a ploughshare mixer for additional 3 minutes. 24 mass % (respect to the total amount of to be obtained as 100 mass %) of water was sprayed and added to the obtained mixture, and the whole was mixed using a ploughshare mixer for additional 3 minutes. Then, the mixture was kneaded using a sigma kneader for 30 minutes, to thereby obtain clay.

Next, the obtained clay was formed into clay of a cylinder shape using a vacuum tug mill, and was formed into a honeycomb shape using a ram extruder. The obtained honeycomb formed product was subjected to microwave drying and then to hot air drying, to thereby obtain a dried honeycomb product. The obtained dried honeycomb product was cut into a predetermined size, and cells of the dried honeycomb product was alternately plugged in houndstooth check using a plugging member prepared by forming a slurry of the cordierite raw material. Then, the alternatively-plugged dried honeycomb product was fired under an oxidizing atmosphere at 1,420° C. for 6 hours, to thereby obtain a cordierite honeycomb structure (cell structure: rib thickness (partition wall thickness) of 0.3 mm, number of cells of 47 cells/cm$^3$; size: 144 mm$\phi$×152 mmL).

Examples 5 to 7

Cordierite honeycomb structures were prepared in the same manner as in Example 1 except that fiber alumina used in Example 1 and particulate alumina used in Comparative Example 2 were collectively used as aluminum oxide, which is one component of the cordierite raw material. Table 1 shows the composition of aluminum oxide.

A body strength (KPa) of the dried honeycomb structure obtained by the method of producing a cordierite honeycomb structure shown in each of Examples 1 to 7 and Comparative Examples 1 to 3 was measured. A measurement method involves: working the dried honeycomb product into a measurement sample having a diameter of 25 mm and a height of 25 mm; firing the measurement sample at 700° C.; and measuring a compressive strength of the structure in a direction of a fluid passage. A device used for the measurement was Autograph AG-25TA, manufactured by Shimadzu Corporation. Table 1 shows the results of the measurement.

An SEM photo of each raw material was taken, and an aspect ratio thereof was measured through image analysis. An average particle diameter of each raw material was measured using Particle diameter Distribution Analyzer LA-910, manufactured by Horiba, Ltd. Table 1 shows the results of the measurement.

A porosity of the obtained cordierite honeycomb structure was determined by: measuring a total pore volume (cm$^3$/g) of the cordierite honeycomb structure using Mercury Porosimeter AutoPore III, manufactured by Micromeritics; and calculating the porosity from the following equation.

Porosity=(Total pore volume)/(Total pore volume+1/2.52)×100

A true specific gravity of the cordierite was defined as 2.52 g/cm³. Further, an average pore diameter of the obtained cordierite honeycomb structure was measured using Mercury Porosimeter AutoPore III, manufactured by Micromeritics. Table 1 shows the results of the measurement.

10 cordierite honeycomb structures were prepared for each of Examples 1 to 7 and Comparative Examples 1 to 3 by the method of producing a cordierite honeycomb structure, and crack formation was observed. Crack formation includes formation of a slight crack. Table 1 shows the results.

TABLE 1

| | Aluminum oxide (Al₂O₃) | | | | | | Body | | | |
| | Fiber alumina | | | Particulate alumina | | | strength | | | |
| | Average particle diameter (μm) | Content (mass %) | Aspect ratio | Average particle diameter (μm) | Content (mass %) | Aspect ratio | of dried honeycomb product (KPa) | Porosity of fired product (%) | Average pore diameter of fired product (μm) | Number of crack formation during firing/number of firing |
|---|---|---|---|---|---|---|---|---|---|---|
| Example 1 | 6 | 20 | 3.5 | — | 0 | — | 192 | 58 | 19 | 0/10 |
| Example 2 | 5 | 20 | 3.0 | — | 0 | — | 187 | 57 | 19 | 0/10 |
| Example 3 | 4 | 20 | 2.0 | — | 0 | — | 171 | 57 | 20 | 0/10 |
| Example 4 | 4 | 20 | 1.5 | — | 0 | — | 160 | 57 | 20 | 1/10 |
| Example 5 | 6 | 10 | 3.5 | 6 | 10 | 1.2 | 167 | 58 | 21 | 0/10 |
| Example 6 | 6 | 5 | 3.5 | 6 | 15 | 1.2 | 154 | 57 | 20 | 0/10 |
| Example 7 | 6 | 2 | 3.5 | 6 | 18 | 1.2 | 144 | 57 | 20 | 3/10 |
| Comparative Example 1 | 4 | 20 | 1.3 | — | 0 | — | 142 | 56 | 18 | 6/10 |
| Comparative Example 2 | — | 0 | — | 6 | 20 | 1.2 | 139 | 56 | 19 | 7/10 |
| Comparative Example 3 | — | 0 | — | 5 | 20 | 1.1 | 131 | 57 | 20 | 8/10 |

Regarding the cordierite honeycomb structures of Examples 1 to 7 and Comparative Examples 1 to 3, Table 1 reveals that the cordierite honeycomb structures of Examples 1 to 7 each containing fiber alumina having an aspect ratio of 1.5 or more as part of the cordierite raw material has a higher body strength of the dried honeycomb product and a smaller number of crack formation during firing than those of the cordierite honeycomb structures of Comparative Examples 1 to 3. Regarding the cordierite honeycomb structures of Examples 1 to 4, Table 1 reveals that the cordierite honeycomb structure having a higher aspect ratio of fiber alumina has a higher body strength of the dried honeycomb product. Further, cracks hardly form in the cordierite honeycomb structures of Examples 1 to 4. Regarding the cordierite honeycomb structures of Examples 1, and 5 to 7, Table 1 reveals that the cordierite honeycomb structure with a larger content of fiber alumina having an aspect ratio of 3.5 has a higher body strength of the dried honeycomb product. Further, Table 1 reveals that the cordierite honeycomb structure with less than 5 mass % of fiber alumina having an aspect ratio of 3.5 tends to have an increased number of crack formation during firing, though the number is small.

According to the method of producing a cordierite honeycomb structure of the present invention, formation of cracks in partition walls during firing can be suppressed even when the honeycomb structure is increased in size and reduced in wall thickness. Thus, an yield of the cordierite honeycomb structure improves, to thereby increase a production rate and reduce a production cost.

What is claimed is:

1. A method of producing a cordierite honeycomb structure comprising:
preparing clay containing a cordierite raw material having an aspect ratio of 1.5 or more;
forming the clay to prepare a honeycomb shape;
drying the honeycomb shape to prepare a dried honeycomb product; and
firing the dried honeycomb product to prepare a cordierite honeycomb structure.

2. A method of producing a cordierite honeycomb structure according to claim 1, wherein the cordierite raw material having an aspect ratio of 1.5 or more comprises a fiber.

3. A method of producing a cordierite honeycomb structure according to claim 1, wherein the cordierite raw material having an aspect ratio of 1.5 or more comprises one selected from the group consisting of alumina, aluminosilicate, and silica.

4. A method of producing a cordierite honeycomb structure according to claim 3, wherein the cordierite raw material having an aspect ratio of 1.5 or more comprises one selected from the group consisting of fiber alumina having an average small diameter of 0.5 to 5 μm, fiber aluminosilicate having an average small diameter of 1 to 20 μm, and fiber silica having an average small diameter of 1 to 20 μm.

5. A method of producing a cordierite honeycomb structure according to claim 1, wherein the clay contains the cordierite raw material having an aspect of 1.5 or more in an amount of 5 mass % or more with respect to the total amount of the cordierite raw material included in the clay.

6. A method of producing a cordierite honeycomb structure according to claim 1, wherein the clay contains a cordierite raw material having an aspect ratio of 2 or more.

7. A method of producing a cordierite honeycomb structure according to claim 1, wherein the clay contains a cordierite raw material having an aspect ratio of 3 or more.

\* \* \* \* \*